Dec. 22, 1942.  A. J. TURNBULL  2,305,938
MATERIAL MIXING AND HANDLING PLANT
Filed May 10, 1940  3 Sheets-Sheet 1

INVENTOR.
ARCHIE J. TURNBULL
BY
Flournoy Corey.
ATTORNEY.

Dec. 22, 1942.  A. J. TURNBULL  2,305,938
MATERIAL MIXING AND HANDLING PLANT
Filed May 10, 1940  3 Sheets-Sheet 2

INVENTOR.
ARCHIE J. TURNBULL
BY
Flournoy Corey
ATTORNEY.

Dec. 22, 1942.  A. J. TURNBULL  2,305,938
MATERIAL MIXING AND HANDLING PLANT
Filed May 10, 1940  3 Sheets-Sheet 3
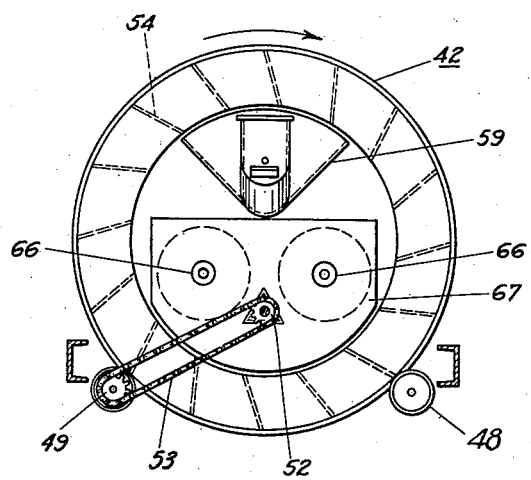
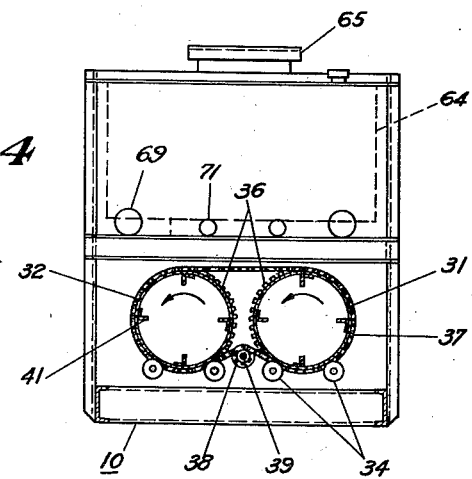
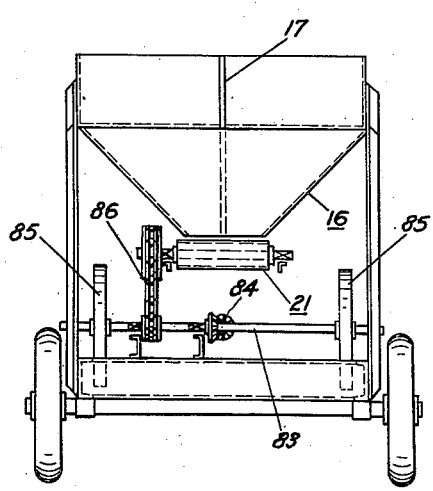
INVENTOR.
ARCHIE J. TURNBULL
BY
Flournoy Corey
ATTORNEY.

Patented Dec. 22, 1942

2,305,938

UNITED STATES PATENT OFFICE 2,305,938

MATERIAL MIXING AND HANDLING PLANT

Archie J. Turnbull, Medina, Wash., assignor to Universal Crusher Company, Cedar Rapids, Iowa, a corporation of Delaware Application May 10, 1940, Serial No. 334,448

5 Claims. (Cl. 259—158)

This invention relates to rock or aggregate handling devices and has particular relation to a compact machine for handling and mixing rock aggregate and bitumen for use in road construction or the like.

In the construction of roads, numerous problems are encountered in supplying and delivering the necessary materials on the job in sufficient quantities and in proper condition for use. In building "black top" roads, for example, it is necessary that various sizes of aggregate and other materials be properly proportioned and thoroughly mixed. It is also necessary that the aggregate be dried in order that it may properly bond with the bitumen.

It is, of course, desirable that the mechanisms for performing the various operations be combined into one portable plant to permit the plant to be used at or close to the scene of operations, and that such a plant be made as compact as possible. State laws usually regulate the maximum length, width and height of equipment to be driven or transported on highways, and my observations have shown that most of the equipment available for such purposes is either of a permanent nature, or must be transported as a number of relatively small units, or in the case of a large unitary structure, parts must be folded up or removed and transported separately in order to bring the size of the plant within the permissible limits.

It is accordingly among the objects of my invention to provide a compact, self contained plant, of the character described, suitable for handling and preparing relatively large quantities of material, and such a plant as may be readily transported without dismantling.

Another object of my invention is the provision of a highly efficient plant of this character through which material is fed in a substantially straight line without sacrificing compactness or portability.

A further object of my invention is the construction and arrangement of a plant featuring a low feeding or receiving hopper and a delivery conveyor suitable for loading into high trucks.

Another object of my invention is the correlation of the various functions of such a machine so as to permit the individual units thereof to perform double duty, that is, take care of two or more operations wherever possible, and thus reduce not only the size of the machine but the cost of operation.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

In said drawings:

Figure 3 is a view in section taken along the line 3—3 of Figure 2 and illustrates the construction of the rotary wheel lift and the arrangement of related parts.

Figure 4 is a view in section taken along the line 4—4 of Figure 2, and

Figure 5 is a view in end elevation of the structure shown in Figures 1 and 2.

Figure 1:
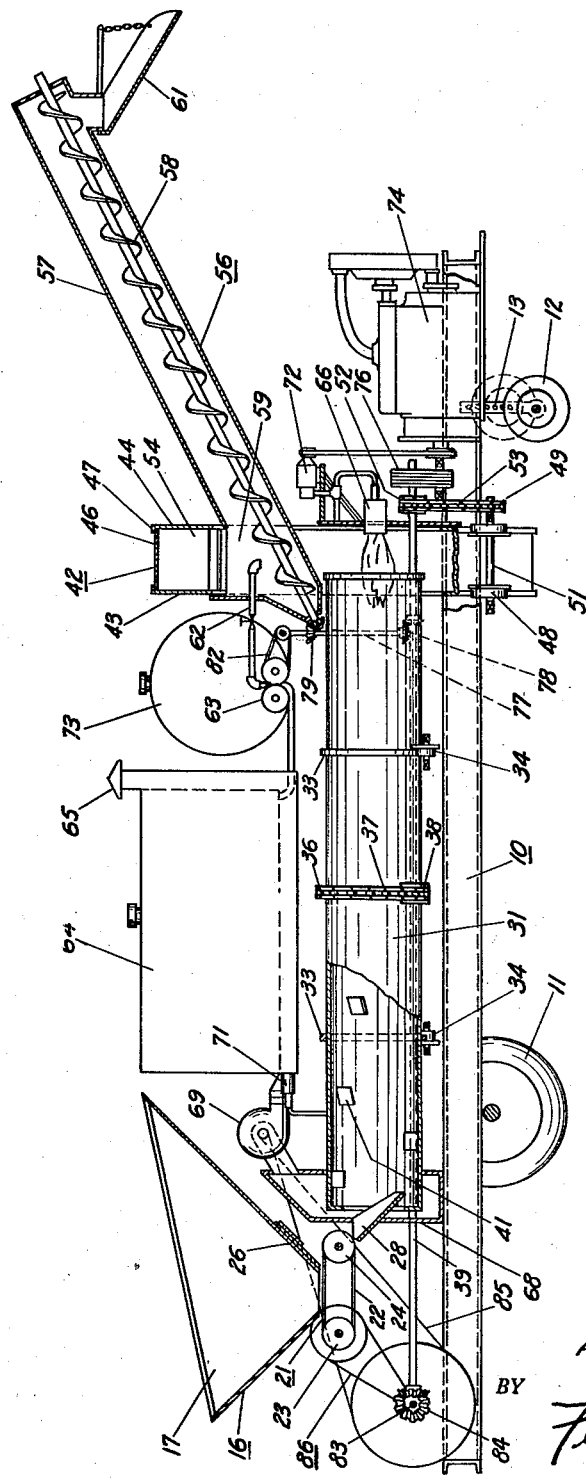
Figure 1 is a more or less schematic view in side elevation of a handling and mixing plant constructed in accordance with a preferred embodiment of my invention.
Figure 2:
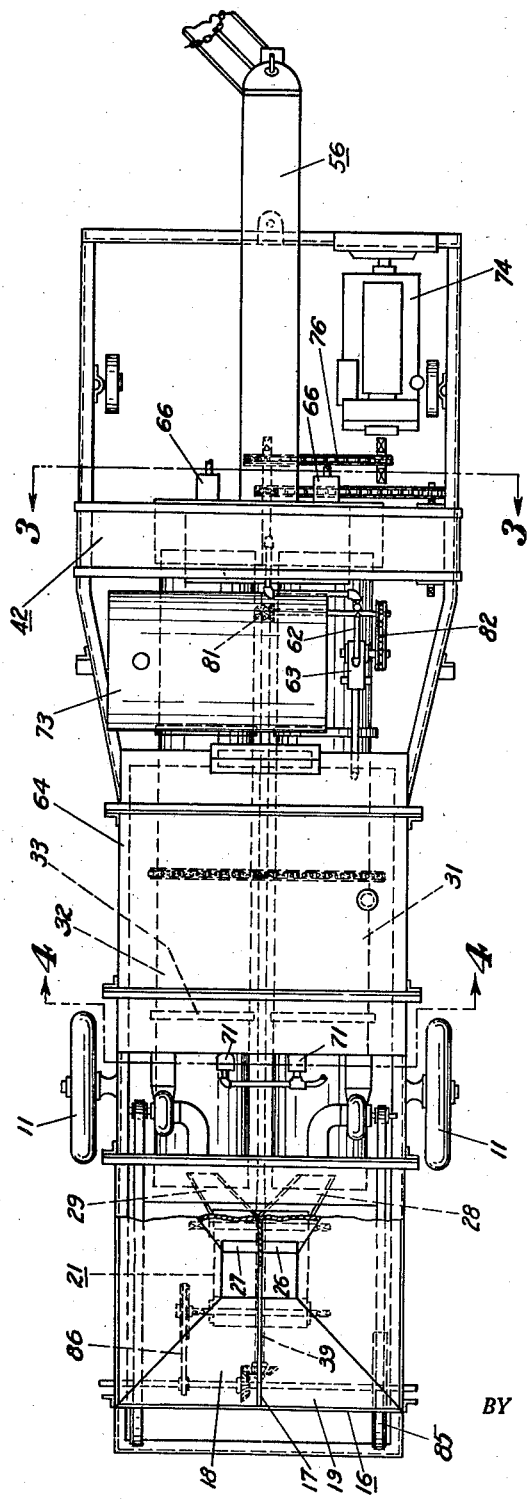
Figure 2 is a plan view of the plant shown in Figure 1 with parts thereof broken away to better illustrate the structure.

Referring now to the drawings and more particularly to Figures 1 and 2 thereof; the plant, as shown, comprises in general a main frame 10, a two-part receiving or feeding hopper 16 for fine and coarse aggregates, a constant speed apron feeder 21 for feeding the aggregate in properly proportioned quantities into a pair of longitudinally extending rotary drier drums 31 and 32.

Material is discharged from these drier drums into a rotary wheel lift 42 which elevates it vertically and discharges into a combination pug mill and paddle or worm conveyor 56. A positive feed metering pump 63 feeds asphalt or bitumen into the pug mill in the desired proportion to the aggregate passing therethrough. A power plant 74, such as a Diesel engine, or the like, mounted on the forward end of the frame 10 supplies power for the operation of all movable parts of the plant.

The frame 10 is supported on rear wheels 11 and front wheels 12. These front wheels, it will be noted, are mounted on posts slidably engaged in the frame to permit the frame to be raised or lowered vertically to facilitate the feeding of aggregate through the drier drums and regulate the rate of feeding. The frame may be raised or lowered by means of jacks and then supported in position by pins inserted in openings in the wheel posts, as shown at 13.

The feeding hopper 16 is supported above one end of the frame by uprights (not shown) and at such a height as to facilitate filling from trucks. This hopper is divided by a partition 17 into two compartments 18 and 19, one for receiving coarse aggregate and the other for "fines."

The apron feeder 21 may comprise a belt 22 supported immediately under the lower end of the hopper for movement around a pair of rollers 23 and 24, one of which may be mounted for free rotation, and the other of which may be driven as will be hereinafter described. The forward side of the hopper is provided with a pair of calibrated, vertically-slidable or adjustable gates 26 and 27. The belt 22 is driven at constant speed and the rate of feed is governed by the vertical adjustment of the gates relative to the belt.

The graded aggregate on the belt is preferably kept separate and diverted through a pair of chutes 28 and 29 into the open ends of the drier drums 31 and 32. These driers are mounted for rotation about their longitudinal axes in a substantially horizontal plane and are provided with peripheral rings or tracks 33—33 and these tracks are adapted to roll freely upon the flanged rollers or wheels 34—34. Sprockets 36 on the drier drums engage a drive chain 37 which is driven in turn by a small sprocket 38 affixed to a central line shaft 39. This drum driving arrangement is shown in more detail in Figure 4.

The drier drums are provided on their inner surfaces with a plurality of spiral vanes 41. These vanes serve the dual purpose of breaking up any damp clods of material and lifting it to permit it to drop downwardly through a blast of heated air and also to cause the material to be moved forwardly through the drums. As explained before, the front wheels of the chassis may be raised relative to the frame in order to assist the vanes in moving the material through the driers.

After the aggregate has passed through the driers, it is discharged into a transversely positioned rotary wheel lift, indicated generally at 42 and shown in greater detail in Figure 3. This vertical elevator is preferably in the form of a hollow-center shell having annular ends 43 and 44 joined together by an outer cylindrical wall 46. The corners of this shell are reinforced by angles 47 which also serve as rails on which the entire wheel may be supported.

The rollers, on which the elevator wheel is adapted to roll, are shown at 48 and are driven from the central line shaft by means including sprockets 49 affixed to the roller shafts 51, sprockets 52 on the line shaft and chain drives 53. It is obvious that all of the supporting rolls or only one set of the rolls may be driven as desired and as shown in Figure 3.

A plurality of plates 54 are mounted within the elevator to provide a large number of pockets. These separator plates may be mounted radially of the wheel, but it is preferable that the inner ends be inclined forwardly in the direction of rotation in order that material being lifted will be carried as high as possible before it is discharged from the pockets of the wheel.

The pug mill and discharge elevator illustrated at 56 comprises a casing or conduit 57, preferably semi-cylindrical on its lower half and in which a worm or paddle conveyor 58 is adapted to rotate. The lower end of the casing 57 terminates in an open top hopper 59.

Aggregate dropped into this hopper by the elevator wheel is thoroughly mixed with bitumen and is, at the same time, conveyed upwardly through the casing 57 and discharged into trucks by the swivel mounted discharge spout 61. The bitumen or asphalt so mixed with the aggregate is metered into the combined pug mill and elevator through a pipe 62 by a pump 63 which is preferably of the positive feed rotary metering type, the intake of which is connected to the asphalt storage and heating tank 64.

The means for heating and drying aggregate in the drier drums comprises a pair of oil burning torches 66—66 mounted on a plate 67 so as to direct their flames into the open discharge ends of the driers. In order to provide a draft to carry the heat through the driers, a hood or casing 68 is constructed so as to enclose as closely as possible the input ends of the driers. A pair of exhaust blowers 69—69 connected with the hood 68 force the hot exhaust gases through the space between the double walls of the aspalt tank 64 and out through the vent 65. A large part of the heat remaining in the exhaust gases is thus utilized in heating the asphalt. A pair of auxiliary oil burning torches 71—71 are provided to supply the need for heat for melting the asphalt not taken care of by the exhaust heat.

All four of the burners hitherto mentioned may be supplied with oil or air under pressure or emulsified oil and air by a blower or pump 72 from an oil storage tank 73.

Power is provided for the entire plant by the gasoline or Diesel engine 74 mounted on the forward end of the chassis, a chain drive 76, and a pair of sprockets serving to transmit the power to the central power or line shaft 39.

A vertical shaft 77 drives the pug mill and delivery conveyor through two pair of bevel gears 78 and 79 and also serves, through the agency of bevel gears and a chain drive 81 and 82 (Figure 2), to drive the asphalt metering pump. A transversely extending shaft 83, most clearly shown in Figure 5, receives its power through bevel gears 84 and, in its turn, drives the exhaust blowers 69 through the belted drives 85—85 and the apron feeder 21 through a sprocket and chain drive 86.

It will be apparent, now, that I have devised a handling and mixing plant having a large capacity and yet combining the various units of the plant in such a manner as to secure a small compact unit of high efficiency as compared with the usual plant of this nature. A device constructed in accordance with my invention, permits easy and convenient loading from trucks and delivery into trucks. The device, as shown, is within the permissible size limits without dismantling any portions of the structure. Furthermore, the entire structure utilizes a minimum of auxiliary elevators or conveyors.

Although I have shown and described a specific embodiment of my invention it is apparent that modifications thereof may be made by those skilled in the art. Such modifications may be made without departing from the spirit and scope of my invention as set forth in the appended claims.

I claim as my invention:

1. In a material handling and mixing plant including a horizontally disposed drier drum and a bitumen storage tank, means for supplying heat at one end of the drier drums, and means for withdrawing warm exhaust air from the opposite end of the drier drum and for causing it to wipe the surface of the bitumen storage tank.

2. In a material mixing and handling plant, a cylindrical drier drum disposed in substantially horizontal position, means for directing aggregate into the drier drum at one end thereof and for discharging it from the other end thereof, a storage tank, for bituminous material, having a double outer wall, disposed adjacent the drier drum, means for providing and directing heat into the discharge end of the drier drum, a hood adapted to substantially close the intake end of the drier drum, and blower means connected with the hood and with the storage tank whereby heated air from the heating means will be drawn through the drier drum, to dry material therein, and exhausted to the outside under pressure after passing between the double walls of the bitumen storage tank wherein the greater portion of useable heat is transferred to the bituminous material.

3. In a machine for producing asphalt and crushed rock mixture, a drier drum, a means for delivering aggregate to the drier drum, means for heating the aggregate in the drier drum, rotary wheel lift means for receiving, mixing, aerating, and for lifting material discharged from the drier drum to a higher level, a rotary mixing conveyor having one end thereof projecting into the rotary wheel lift above the end of the drier drum to receive material from the rotary wheel lift, means for feeding liquid bitumen into the material after it is received by the conveyor whereby the rotary mixing conveyor will mix the bitumen and material and convey the mixed material to the other end of the conveyor, said heating means being positioned to project a heating flame through the wheel lift and into the drier drum.

4. In a machine of the class described, a drier drum, means for heating material in the drier drum, a bitumen storage tank, and means for heating the bitumen in the storage tank including means for conducting heat discharged from the drier drum to the bitumen storage tank.

5. In a material hadling and mixing plant, a pair of drier drums positioned in a substantially horizontal plane, a feeding hopper having a pair of bins, means for feeding material from the bins into respective drums at proportioned rates of speed, means for heating the material in the drier drums, rotary wheel lift means for receiving, mixing, aerating, and for lifting material discharged from the drums to a higher level, a rotary mixing conveyor having one end thereof projecting into the rotary wheel lift above the ends of the drier drums to receive material from the rotary wheel lift, means for feeding liquid bitumen into the material after it is received by the conveyor whereby the rotary mixing conveyor will mix the bitumen and material and convey the mixed material to the other end of the conveyor, said heating means being positioned to project a heating flame through the wheel lift and into the drier drums.

ARCHIE J. TURNBULL.